(12) United States Patent
Petruzzelli (10) Patent No.: US 10,341,722 B2
(45) Date of Patent: Jul. 2, 2019

(54) DISTRIBUTED INDOOR SMART ANTENNA SYSTEM FOR OVER-THE-AIR TELEVISION RECEPTION

(71) Applicant: DISH Technologies L.L.C.

(72) Inventor: Edmund F. Petruzzelli, Centennial, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

(21) Appl. No.: 15/389,274

(22) Filed: Dec. 22, 2016

(65) Prior Publication Data

US 2018/0184164 A1 Jun. 28, 2018

(51) Int. Cl.
| | | |
|---|---|---|
| *H04N 21/4402* | (2011.01) | |
| *H04N 21/4363* | (2011.01) | |
| *H04N 21/426* | (2011.01) | |
| *H04L 12/66* | (2006.01) | |
| *H04B 7/08* | (2006.01) | |
| *H04N 21/438* | (2011.01) | |
| *H04H 20/63* | (2008.01) | |

(Continued)

(52) U.S. Cl.
CPC ....... *H04N 21/440218* (2013.01); *H04B 7/08* (2013.01); *H04H 20/63* (2013.01); *H04L 12/66* (2013.01); *H04N 21/4126* (2013.01); *H04N 21/4263* (2013.01); *H04N 21/42607* (2013.01); *H04N 21/4382* (2013.01); *H04N 21/43615* (2013.01); *H04N 21/43637* (2013.01)

(58) Field of Classification Search
CPC ....... H04N 21/440218; H04N 21/4126; H04N 21/42607; H04N 21/4263; H04N 21/43615; H04N 21/43637; H04N 21/4382; H04B 7/08; H04H 20/63; H04L 12/66

See application file for complete search history.

(56) References Cited

U.S. PATENT DOCUMENTS

| | | | |
|---|---|---|---|
| 6,577,353 B1 * | 6/2003 | Welles, II | ............ H04B 7/0871 348/705 |
| 7,502,587 B2 | 3/2009 | Petruzzelli | |
| 7,792,486 B2 | 9/2010 | Petruzzelli | |

(Continued)

OTHER PUBLICATIONS

Oksman, Vladimir et al., "G.hn: The New UTI-T Home Networking Standard", Oct. 2009, IEEE Communications Magazine, pp. 1-8.*

*Primary Examiner* — Nicholas T Corbo
(74) *Attorney, Agent, or Firm* — Seed Intellectual Property Law Group LLP (57) ABSTRACT

A distributed indoor antenna system for over-the-air television reception includes technological improvements that increase signal quality on a display device. The system includes a plurality of active distributed antenna nodes and a reception gateway. The distributed antenna nodes are placed and oriented at various spaced-apart locations around a user's residence or other location of interest. Each of the plurality of active distributed antenna nodes includes an antenna, a demodulator, and a Wi-Fi converter. The plurality of active distributed antenna nodes receives the broadcast signals, decodes the broadcast signals, and transcodes the decoded broadcast signals into a Wi-Fi signal format. The reception gateway receives the transcoded broadcast signals and determines which signal or which signal combination to retransmit to the display device.

29 Claims, 6 Drawing Sheets

(51) Int. Cl.
*H04N 21/41* (2011.01)
*H04N 21/436* (2011.01)

(56) References Cited

U.S. PATENT DOCUMENTS

| | | | |
|---|---|---|---|
| 8,108,900 B2 | 1/2012 | Petruzzelli | |
| 8,132,214 B2 | 3/2012 | Petruzzelli | |
| 8,369,772 B2 | 2/2013 | Petruzzelli | |
| 8,528,025 B2 | 9/2013 | Petruzzelli | |
| 8,626,097 B2 | 1/2014 | Petruzzelli | |
| 8,855,547 B2 | 10/2014 | Petruzzelli | |
| 9,179,170 B2 | 11/2015 | Petruzzelli | |
| 2004/0250273 A1* | 12/2004 | Swix | H04N 21/4122 725/25 |
| 2006/0031894 A1 | 2/2006 | Petruzzelli | |
| 2006/0048197 A1 | 3/2006 | Petruzzelli | |
| 2007/0071013 A1* | 3/2007 | Rooyen | H04B 7/0857 370/395.64 |
| 2008/0238808 A1* | 10/2008 | Arita | H01Q 3/24 343/893 |
| 2008/0301750 A1* | 12/2008 | Silfvast | H04N 7/17318 725/131 |
| 2009/0154387 A1* | 6/2009 | Rogers | H04N 21/2381 370/312 |
| 2009/0172748 A1 | 7/2009 | Petruzzelli | |
| 2009/0190041 A1* | 7/2009 | Narita | H04N 5/63 348/730 |
| 2009/0254955 A1 | 10/2009 | Petruzzelli | |
| 2011/0059690 A1 | 3/2011 | Petruzzelli | |
| 2011/0078749 A1* | 3/2011 | Wieck | H01Q 1/22 725/81 |
| 2011/0159804 A1 | 6/2011 | Petruzzelli | |
| 2012/0133840 A1* | 5/2012 | Shirasuka | H04B 7/08 348/732 |
| 2012/0135678 A1 | 5/2012 | Petruzzelli | |
| 2012/0167147 A1 | 6/2012 | Petruzzelli | |
| 2013/0042281 A1* | 2/2013 | Buff | H04N 21/43637 725/81 |
| 2013/0120658 A1 | 5/2013 | Petruzzelli | |
| 2013/0227619 A1* | 8/2013 | Lewis | H01Q 1/007 725/81 |
| 2015/0201232 A1* | 7/2015 | Gintis | H04N 5/775 725/70 |
| 2015/0372718 A1* | 12/2015 | McConnell | H04B 3/544 375/257 |
| 2016/0337677 A1* | 11/2016 | Lee | H04N 21/23435 |
| 2018/0131990 A1* | 5/2018 | Desclos | H04L 12/66 |

* cited by examiner

DISTRIBUTED INDOOR SMART ANTENNA SYSTEM FOR OVER-THE-AIR TELEVISION RECEPTION

BACKGROUND

Technical Field

The present disclosure relates generally to a smart antenna system, and more particularly, but not exclusively, to a distributed indoor smart antenna system for over-the-air television reception.

Description of the Related Art

Content distributors deliver audiovisual content to users through a variety of different systems. These systems may include over-the-air broadcast television, satellite television, and cable television. Each of these systems has advantages and disadvantages. For example, over-the-air television is generally free, but is limited to the broadcast range of the system and which may be affected by the terrain between the receiving antenna and the broadcast tower. While satellite and cable television may be accessed at great distances from the distributor, they are generally rather expensive and may have their own limitations as well (e.g., weather).

Many people are unwilling to pay monthly service fees to a satellite or cable television distributor and would prefer to receive free channels via over-the-air television. Unfortunately, hills, mountains, great distances, and other obstacles can lead to poor reception of over-the-air television signals. As a result, the viewer may be unable to receive over-the-air television or the received signals may be insufficient to provide a usable image to the viewer.

Over-the-air digital TV reception is often unreliable, particularly indoors. There are a number of variables that affect reception and not all are under the control of the consumer. Problems include weak signal coverage, diverse locations of the TV transmission towers, and limitations affecting optimal location of the receiving antenna.

Generally, optimal over-the-air digital TV reception is only achieved with an outdoor antenna, mounted at the highest point of a single family residence (building, other structure, or the like) and using an antenna with relatively high gain. Installing an outdoor over-the-air antenna is not desirable for average consumers. Specialized tools and techniques are required that are not readily available. Additionally, confirming that a reliable set of signals within a desired margin have been achieved may only be determined by specialized RF testing equipment and the knowledge to use them. These facts (as well as aesthetic concerns related to large antennas on a roof) discourage most consumers from using outdoor over-the-air antennas.

Accordingly, the limitations associated with outdoor over-the-air antennas have led to an increased use of indoor antennas. Most indoor antennas have planar antenna structures that attempt to emulate a dipole in one or more planes. Alternatively, some indoor antennas are omni-directional. Notably, a high number of consumers are unsatisfied with the reception received using indoor antennas since over-the-air digital TV indoor antennas introduce a host of new potential reception inhibiting factors that were not anticipated in the planning for digital TV coverage and reception. These inhibiting factors include: (1) a weaker signal due to attenuation (loss) through a building's outside walls, (2) uncontrolled bouncing of signals within the room where the indoor antenna is located, and (3) interference with other electronic devices in a residence (building, other structure, or the like) in which the indoor antenna is located.

The effect of signal loss is a reduction in a digital TV station's coverage area and/or reduced margin for acceptable reception under normal variations of a transmitted RF signal (i.e., rain or foliage). The effect of signal bouncing is a condition known as multipath, in which the same desired signal may enter the antenna from different paths, and the multiple signals corrupt or cancel out one another for that particular channel. Multipath is a variable of many factors and is difficult to predict or correct when it is severe. Other signal degradation aspects may also need to be taken into consideration, including movable obstructions in an environment that may absorb a signal, interfere with signal, or otherwise contribute to multipath, such as a human body.

There have been many improvements in signal transmission, reception, and processing in recent years. U.S. patent applications in one or more of these fields include: U.S. Patent Publication No. 2013/0120658 (Method and Device for Band Translation); U.S. Patent Publication No. 2012/0167147 (Low Noise Block Converter Feedhorn); U.S. Patent Publication No. 2012/0135678 (Drift Compensator fora Tuning Device); U.S. Patent Publication No. 2011/0159804 (Methods and Apparatus for Identifying Signal Degradation in a Receiver); U.S. Patent Publication No. 2011/0059690 (Method and Device for Band Translation); U.S. Patent Publication No. 2009/0254955 (Low Noise Block Converter Feedhorn); U.S. Patent Publication No. 2009/0172748 (Drift Compensator for a Tuning Device); U.S. Patent Publication No. 2006/0048197 (Method and Device for Band Translation); and U.S. Patent Publication No. 2006/0031894 (Method and Device for Band Translation).

U.S. patents in one or more of these fields include: U.S. Pat. No. 9,179,170 (Low Noise Block Converter Feedhorn); U.S. Pat. No. 8,855,547 (Method And Device For Band Translation); U.S. Pat. No. 8,626,097 (Methods And Apparatus For Identifying Signal Degradation In A Receiver); U.S. Pat. No. 8,528,025 (Drift Compensator For A Tuning Device); U.S. Pat. No. 8,369,772 (Method And Device For Band Translation); U.S. Pat. No. 8,132,214 (Low Noise Block Converter Feedhorn); U.S. Pat. No. 8,108,900 (Drift Compensator For A Tuning Device); U.S. Pat. No. 7,792,486 (Method And Device For Band Translation); and U.S. Pat. No. 7,502,587 (Method And Device For Band Translation).

Advanced antenna and receiver design techniques can be implemented to minimize or overcome some of the limitations of indoor over-the-air antennas. However, these advanced antenna and receiver design techniques also have disadvantages as well. For example, most suppliers of indoor over-the-air antennas for digital TV reception strongly recommend that the antenna be placed at a window location as high as possible within the home (building, other structure, or the like). This is often not possible or practical if the home does not have a window facing the general direction of the local TV broadcast towers. The more the antenna is moved from line-of-sight orientation, the greater the effects of multipath. Additionally, if the central TV viewing location is on the first floor of a residence, placing the indoor over-the-air antenna in a second floor window and cabling to the central TV location on the first floor is a difficult and expensive endeavor.

Another challenge with indoor over-the-air antennas is the inability to receive all the available broadcast TV stations from a single antenna location. An example of this difficulty is when an antenna is only able to receive one particular TV station in one room, while only able to receive another particular TV station in another room. This may be an effect of multipath. Usually, a compromise location must be selected that still leaves one or more desired TV stations unavailable on the TV. It is with respect to these and other considerations that the embodiments described herein have been made.

Notably, all of the subject matter discussed in this section is not necessarily prior art and should not be assumed to be prior art merely as a result of its discussion in this section. Accordingly, any recognition of problems in the prior art discussed in this section or associated with such subject matter should not be treated as prior art unless expressly stated to be prior art. Instead, the discussion of any subject matter in this section should be treated as part of the identification of the technological problem to be overcome, which in and of itself may also be inventive.

BRIEF SUMMARY

The present disclosure is direct towards a distributed indoor antenna system for over-the-air television reception that includes technological improvements that increase signal quality on a display device. The distributed indoor antenna system uses multiple distributed antenna nodes that are placed and oriented at various spaced-apart locations around a user's residence or other location of interest. In one embodiment, each of the multiple distributed antenna nodes includes an antenna that receives broadcast signals, a tuner that decodes the broadcast signals, and a Wi-Fi converter that changes the decoded broadcast signals into a format that enables Wi-Fi transmission. A reception gateway receives the signals from the multiple distributed antenna nodes and sends a retransmission signal to the display device. The retransmission signal may be a signal or signal combination, as determined by the reception gateway. The display device may be selected from wireless devices such as smartphones and tablets, or may be a wired device such as a large screen television.

In at least one embodiment of the distributed indoor antenna system for receiving over-the-air broadcast signals, the system includes a plurality of distributed antenna nodes and a reception gateway. In such an embodiment, each of the plurality of distributed antenna nodes is spaced apart from each other to achieve spatial diversity. Additionally, in some embodiments of the distributed indoor antenna system, each of the plurality of distributed antenna nodes includes: an antenna, a demodulator, and a Wi-Fi converter. The antennas receive the over-the-air broadcast signals. The demodulators, which are in communication with the antennas, decode the over-the-air broadcast signals. The Wi-Fi converter transcodes the decoded broadcast signals into a Wi-Fi signal format.

Continuing, in some embodiments the reception gateway includes a Wi-Fi receiver that receives the transcoded broadcast signals. The reception gateway includes a diversity receiver that determines a retransmission signal to retransmit to the display device. In some implementations, the diversity receiver determines a retransmission signal from a single distributed antenna node in the plurality of distributed antenna nodes to retransmit to the display device. In other implementations, the diversity receiver determines a retransmission signal from a combination of multiple distributed antenna nodes in the plurality of distributed antenna nodes to retransmit to the display device. In still other implementations, the diversity receiver determines a retransmission signal from a single distributed antenna node in the plurality of distributed antenna nodes to retransmit to the display device during a first time period and the diversity receiver determines a retransmission signal from a combination of multiple distributed antenna nodes in the plurality of distributed antenna nodes to retransmit to the display device during a second time period.

In another aspect of the distributed indoor antenna system, each of the plurality of distributed antenna nodes may act as an independent tuner. The system may further include a multiplexer in communication with each of the independent tuners, wherein the multiplexer generates a multiplexed stream using the decoded broadcast signals. The plurality of distributed antenna nodes may each further include a powerline interface. The reception gateway may further include a powerline receiver. In such an embodiment, the reception gateway receives the decoded broadcast signals via the powerline interface from each of the plurality of distributed antenna nodes. The over-the-air broadcast signals may be digital television over-the-air broadcast signals.

The one or more display devices may include large screen televisions, desktop computers, laptop computers, smart phones, tablets, or combinations thereof. The reception gateway may transmit the transcoded broadcast signals to the one or more display devices via an Ethernet connection. The reception gateway may transmit the transcoded broadcast signals to the one or more display devices via a wired connection. The reception gateway may further format the transcoded broadcast signals into another wireless standard for retransmission to the one or more display devices. The reception gateway may include a Wi-Fi antenna that retransmits the transcoded broadcast signals to the one or more display devices.

In another embodiment, a method of receiving and processing over-the-air broadcast signals using a distributed indoor antenna system is disclosed. The method includes placing and orienting a plurality of active distributed antenna nodes. Each of the plurality of active distributed antenna nodes is spaced apart from each other to achieve spatial diversity. Additionally, each of the plurality of active distributed antenna nodes includes an antenna, a demodulator, and a Wi-Fi converter. The method also includes receiving broadcast signals at the antenna in each of the plurality of active distributed antenna nodes. The method further includes decoding the broadcast signals using the demodulator in each of the plurality of active distributed antenna nodes. The method additionally includes transcoding the decoded broadcast signals into a Wi-Fi signal format using the Wi-Fi converter in each of the plurality of active distributed antenna nodes. Next, the method includes receiving the transcoded broadcast signals at a reception gateway from each of the plurality of active distributed antenna nodes. The method also includes determining, using a diversity receiver in the reception gateway, a retransmission signal to retransmit to a display device. The reception gateway may determine the retransmission signal from a single signal from the plurality of distributed antenna nodes or from a signal combination from multiple distributed antenna nodes in the plurality of distributed antenna nodes. The method further includes retransmitting the retransmission signal to the display device.

The powerline interface may use G.hn home networking specification to transmit the decoded broadcast signals to the reception gateway. The G.hn home networking specification may enable transmission of the decoded broadcast signals to the reception gateway using legacy wires that include telephone wiring, coaxial cables, power lines, or combinations thereof.

These features with other technological improvements, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a distributed indoor smart antenna system for over-the-air digital television reception. Representative examples utilizing many of these additional features and teachings, both separately and in combination, are described in further detail with reference to attached FIGS. 1-5. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The embodiments of the distributed indoor over-the-air antenna system incorporate technical improvements to enhance reception for over-the-air digital television broadcasts. One such technical improvement is smart antenna technology. Smart antennas incorporate certain aspects of diversity reception technology into their decision making capabilities. Specifically, smart antennas employ specific parametric feedback from a digital TV tuner and/or demodulator(s) to select the best antenna element or antenna node to deliver the requested TV signal on a per channel basis. Usually a smart antenna requires some communication between the host device, such as a set top box, and the antenna.

Technological improvements are also provided through the use of spatial diversity antennas, which employ multiple antennas (usually with the same characteristics) that are physically separated from one another. Spatial diversity antennas also incorporate diversity reception technology, which may be similar to basic smart antenna technology. There are various types of diversity reception technology, each of which generally uses some type of signal post processing. One type of diversity reception is "switched diversity," which employs multiple antenna elements. The antenna elements may be scanned automatically or manually, with the received signals being monitored for some signal quality metric. In a switched diversity receiver, the signal from only one antenna is fed to the receiver for as long as the quality of that signal remains above some defined level. If the signal degrades (e.g., over time or with respect to different channels) then another antenna element is utilized.

Another type of diversity reception is "selected diversity," which presents only one antenna element signal (out of multiple antenna elements) to a diversity receiver at any given time. The antenna element signal chosen is based on the best signal-to-noise ratio (SNR) among the received signals from the multiple antenna elements. Accordingly, selected diversity requires that a pre-measurement take place and that all antenna elements have established connections. The actual selection process may take place in between received packets of information, which ensures that a single antenna connection is maintained to the extent possible. Switching can then take place on a packet-by-packet basis, if necessary.

Still another type of diversity reception is "diversity combining" (e.g., maximal-ratio combining), in which all antenna elements maintain established connections at all times. The signals of all the antenna elements are then combined. Depending on the sophistication of the system, the individual antenna element signals may be added directly (e.g., equal gain combining) or weighted and added (e.g., maximal-ratio combining). A diversity combining system provides greater resistance to fading, but consumes more power since all the individual antenna element signal paths must remain energized.

Figure 1:
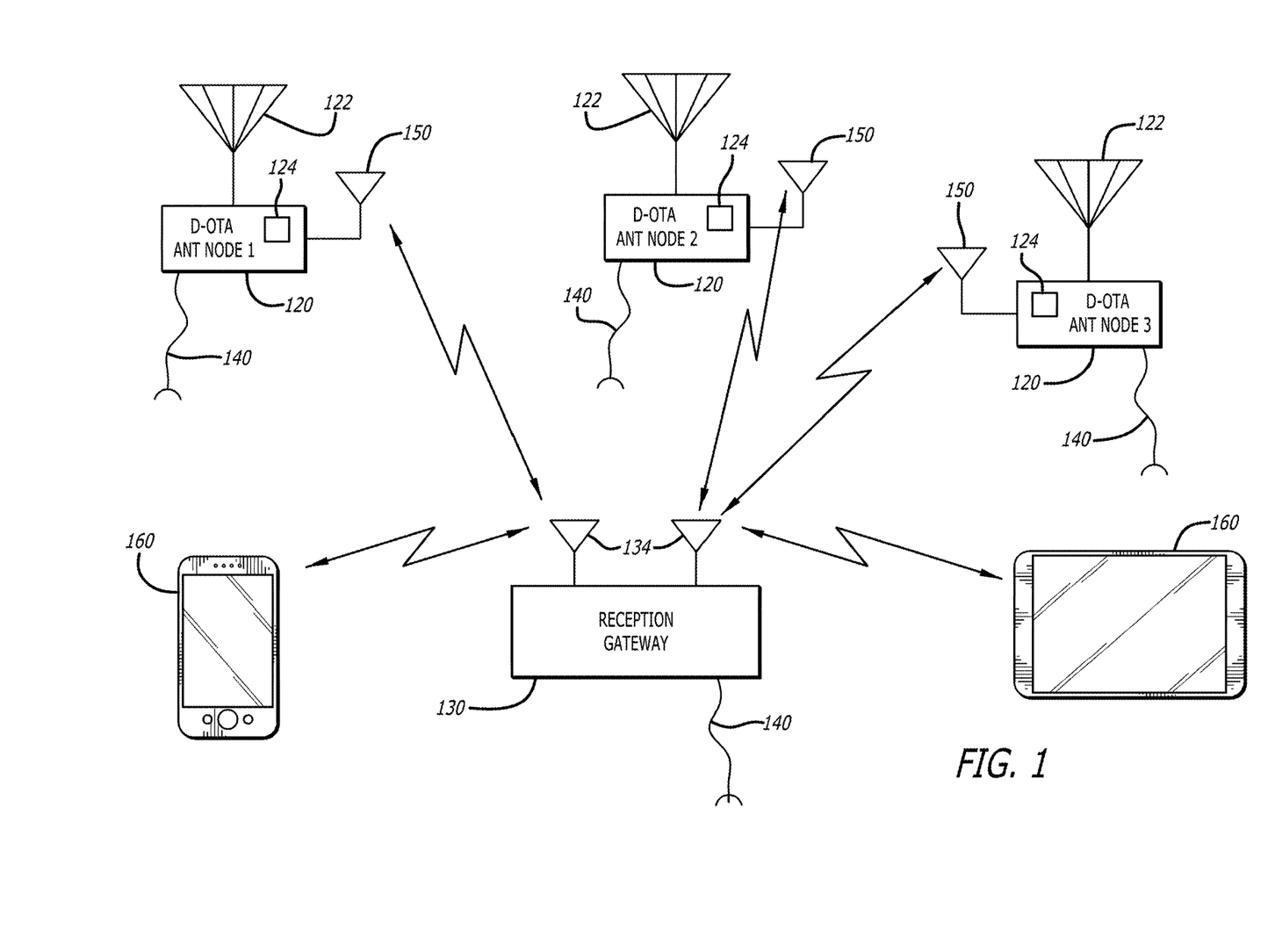
FIG. 1 illustrates an over-the-air television reception system with multiple distributed antenna nodes that transmit to a reception gateway and multiple display devices.

FIG. 1 shows one embodiment of distributed indoor smart over-the-air antenna system 100 that receives over-the-air digital television signals that have been broadcast from a transmission tower (not shown). In the embodiment shown in FIG. 1, the distributed indoor smart over-the-air antenna system 100 includes three active distributed antenna nodes 120 (e.g., Ant-1, Ant-2, and Ant-3). In some embodiments, the three active distributed antenna nodes 120 are signal receiving devices that are spaced apart from each other in a user's residence (building, other structure, or the like) to achieve spatial diversity and positioned/oriented to improve the received signal strength.

Specifically, each distributed antenna node 120 receives digital television signals (e.g., content) via over-the-air reception antenna 122, decodes the content using a tuner/demodulator (e.g., ATSC demodulator) 124, transcodes the content into a Wi-Fi signal format (e.g., IEEE 802.11), and retransmits the content to the reception gateway 130, which acts as a diversity control node (e.g., diversity receiver 136). ATSC Demodulation is the transformation of a signal into a usable signal that a television may use to produce images and sound. Each active distributed antenna node 120 also sends signal metrics to the reception gateway 130, which analyzes the signal quality (e.g., Modulation Error Ration, Signal-to-Noise ratio, and the like). Various types of diversity receivers are known by those of ordinary skill in the art. Diversity receivers such as, for example, the Furious True-D Diversity Receiver by Furious FPT, may be purchased from FPV Manuals LLC, located at 1127 Goodrich Ave, Sarasota, Fla. 34236. The reception gateway 130 determines which signal, or signal combination, from its respective active distributed antenna node 120 provides the highest signal strength.

The retransmission of the content to the reception gateway 130 may occur via a G.hn powerline interface 140 (using the existing powerlines in the user's residence) and/or via a Wi-Fi converter 150, such as over Wi-Fi using IEEE 802.11n/802.11ac. G.hn is a signal transmission specification for home networking that operates over existing wiring, such as telephone wiring, coaxial cables, and powerlines. Some embodiments may also implement a HomePlug interface (not shown) or Ethernet interface (not shown) for retransmission of the content to the reception gateway 130. HomePlug is another category of powerline communications specification for home networking over existing home electrical wiring. In some embodiments in which the content is only retransmitted to the reception gateway 130 from the active distributed antenna nodes 120 via a powerline connection or Ethernet, the transcoding of the content into a Wi-Fi signal format may not be necessary.

In some embodiments of the distributed indoor smart over-the-air antenna system 100, the reception gateway 130 stores a channel table that has been scanned, and records the best active distributed antenna node 120 for each channel, which speeds up subsequent channel changing requests. In some embodiments, the reception gateway 130 may periodically re-scan the channel table as a background task to check for changing reception conditions. This channel table re-scan may be an automatic process of the distributed indoor smart over-the-air antenna system 100 and/or a manual process initiated by the user.

In at least one embodiment, the three active distributed antenna nodes 120 are separately positioned from each other and independently oriented to achieve spatial diversity. For example, the first active distributed antenna node 120 may be placed in an upstairs bedroom near a window in a user's residence, the second active distributed antenna node 120 may be placed in an upstairs den on another side of the residence, and the third active distributed antenna node 120 may be placed in a living room in still another area of the residence. Preferably, the three active distributed antenna nodes 120 are placed in locations and orientations that provide for greatly increased reception of over-the-air broadcast signals from a local transmission tower. In some embodiments, a signal sensor may be used to help locate and orient the active distributed antenna nodes 120. The signal sensor may be a piece of dedicated equipment or the signal sensor may be an application that is executed from a smart phone, tablet, or television.

In some embodiments of the distributed indoor smart over-the-air antenna system 100, other accompanying hardware elements (e.g., one or more processors, switch matrix, amplifiers controllers, and the like), may also be included in the active distributed antenna nodes 120 or in other parts of the distributed indoor smart over-the-air antenna system 100. Some embodiments of the active distributed antenna nodes 120 may include over-the-air reception antennas 122 that comprise flexible antenna panels, although a variety of antenna configurations are useful with respect to various embodiments described herein. For example, useful antennas include, but are not limited to, a planar antenna, a directional antenna, an omni-directional antenna, an amplified antenna, and the like.

In the distributed indoor smart over-the-air antenna system 100, the reception gateway 130 is a central receiving device that is positioned in the user's residence (building, other structure, or the like) and configured to receive signals from all of the active distributed antenna nodes 120. In some embodiments, the reception gateway 130 may be referred to as a television receiver because this device provides the received signals that contain the audiovisual content to one or more display devices 160 for viewing by an end user. Examples of reception gateways 130 may include, but are not limited to, a set-top box, a computer, a router, or other content receiver. In some embodiments, the reception gateway 130 receives signals via a G.hn powerline interface 140 (using the existing powerlines in the user's residence) or via a Wi-Fi converter 150 (such as over Wi-Fi using IEEE 802.11n/802.11ac), and retransmits the signal to the one or more display devices 160. In various embodiments, the one or more display devices 160 may include large screen televisions, monitors, tablets, smart phones, laptop computers, desktop computers, personal digital assistants, or other display devices. In some embodiments, the reception gateway 130 also includes a Wi-Fi router and transcodes the signal before retransmitting the signal to the one or more display devices 160 via a Wi-Fi network. In other embodiments, the reception gateway 130 retransmits the signal to the one or more display devices 160 via a wired connection.

Figure 2:
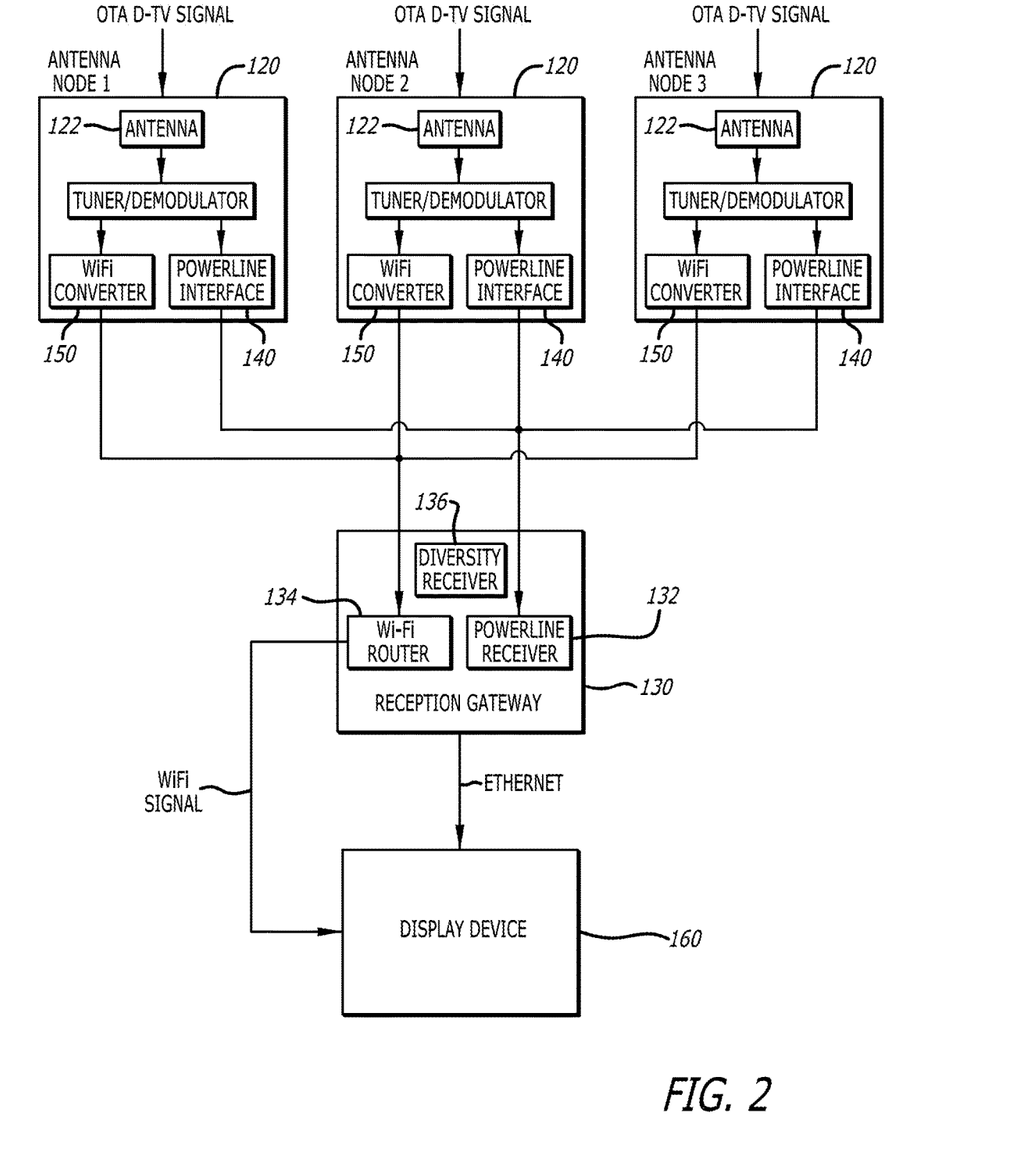
FIG. 2 illustrates transmission of over-the-air television signals from multiple distributed antenna nodes through a reception gateway to a display device in accordance with embodiments described herein.

FIG. 2 depicts another embodiment of the distributed indoor smart over-the-air antenna system 100 that receives over-the-air digital television signals broadcast from a transmission tower. In this embodiment, the active distributed antenna nodes 120 that are located in a user's residence each include an antenna 122, a tuner/demodulator 124, a powerline interface 140, and Wi-Fi converter 150. The user's residence (building, other structure, or the like) also includes a reception gateway 130 and a display device 160. In at least one embodiment, the reception gateway 130 further includes a powerline receiver 132, a Wi-Fi router 134, and a diversity receiver 136.

A transmission tower (not shown) broadcasts an over-the-air digital television signal, which is received by antenna 122 and processed by the tuner/demodulator 124 in each of the plurality of active distributed antenna nodes 120. In at least one embodiment, the tuner/demodulator 124 decodes the over-the-air digital television signal and transmits the decoded signal to the powerline interface 140 and/or the Wi-Fi converter 150. The Wi-Fi converter 150 generates or reformats the decoded signal into IP packets that may be provided to the Wi-Fi router 134 in the reception gateway 130 over a wireless local area network. In some embodiments, the Wi-Fi converter 150 and tuner/demodulator 124 are separate components, while in other embodiments their functionality may be combined into a single component.

In one embodiment, the Wi-Fi router 134 of the reception gateway 130 receives the transmitted signals over Wi-Fi (e.g., IEEE 802.11n/802.11ac) and provides the signals to the display device 160. In some embodiments, the reception gateway 130 provides the content to display device 160 via an Ethernet connection (or other wired connection). In other embodiments, the Wi-Fi router 134 transcodes the received signals into other wireless signals (e.g., another wireless signal format), and provides these other wireless signals to display device 160.

Although FIG. 2 of the distributed indoor smart over-the-air antenna system 100 illustrates the Wi-Fi router 134 as being a component of the reception gateway 130, in other embodiments these are separate components. For example, Wi-Fi router 134 may be a standalone device that is separate and distinct from reception gateway 130. In yet other embodiments, reception gateway 130 may be a component that is built into the display device 160. In various embodiments, the reception gateway 130 may output digital or analog audio/video signals directly to the display device 160, as shown, or to another device for further processing before the signals are sent to the display device 160.

Figure 3A:
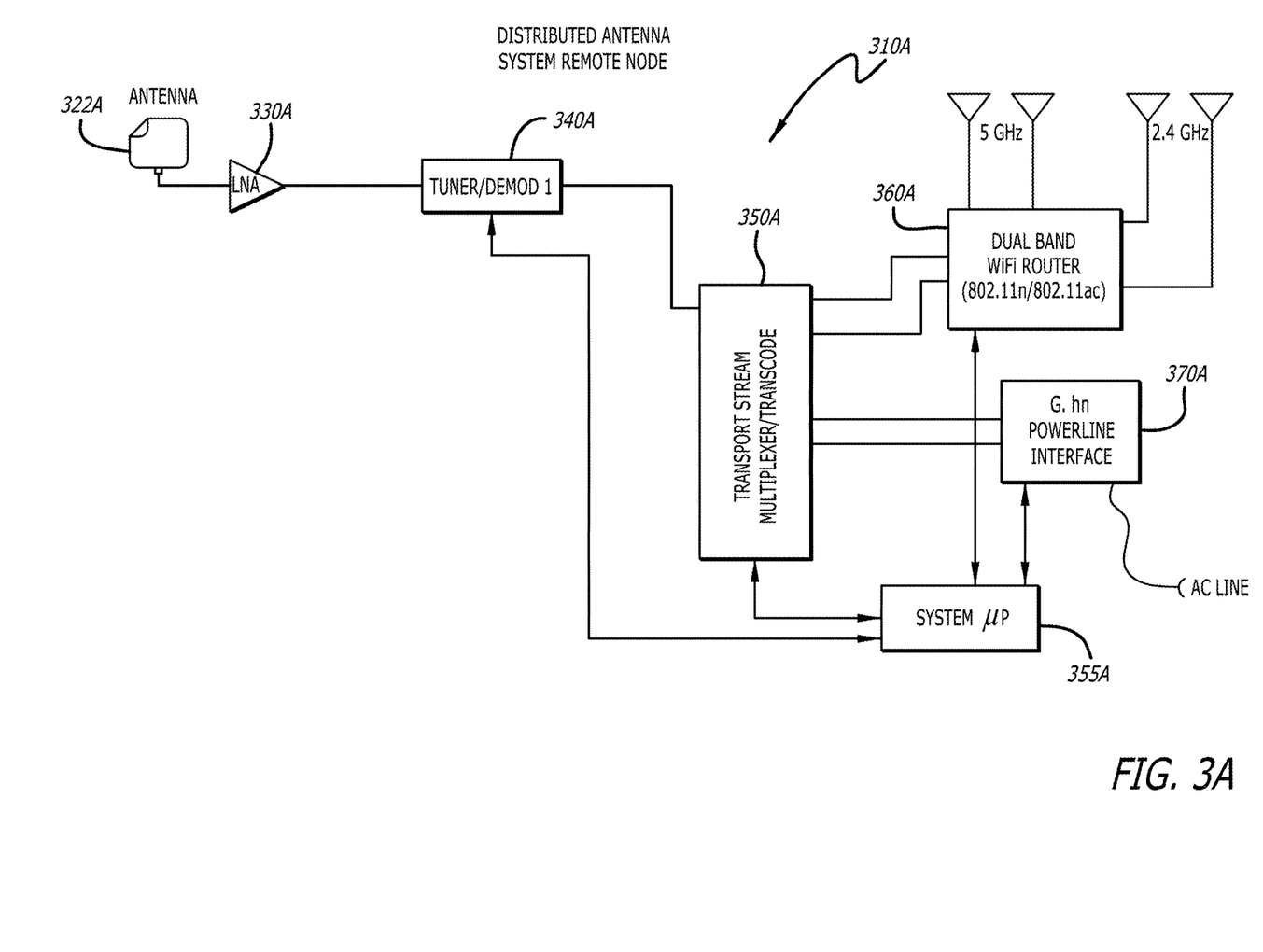
FIG. 3A illustrates a block diagram of a distributed antenna system remote node, as well as a Wi-Fi interface and a powerline interface.

Referring now to the embodiment of FIG. 3A, the distributed indoor smart over-the-air antenna system depicts a distributed antenna system remote node 310A, as well as a Wi-Fi interface 360A and a powerline interface 370A. In at least one embodiment, the distributed antenna system remote node 310A includes an antenna 322A, and low noise amplifier (LNA) 330A, a tuner/demodulator 340A, a transport stream/multiplexer/transcoder 350A, and a processor 355A. In some embodiments of the distributed indoor smart over-the-air antenna system (not shown), another tuner/demodulator enables continuous scanning of frequencies and updates a table of channels and channel characteristics. This configuration enables continuous updating of a list of the best active distributed antenna nodes for use with particular channels.

Figure 3B:
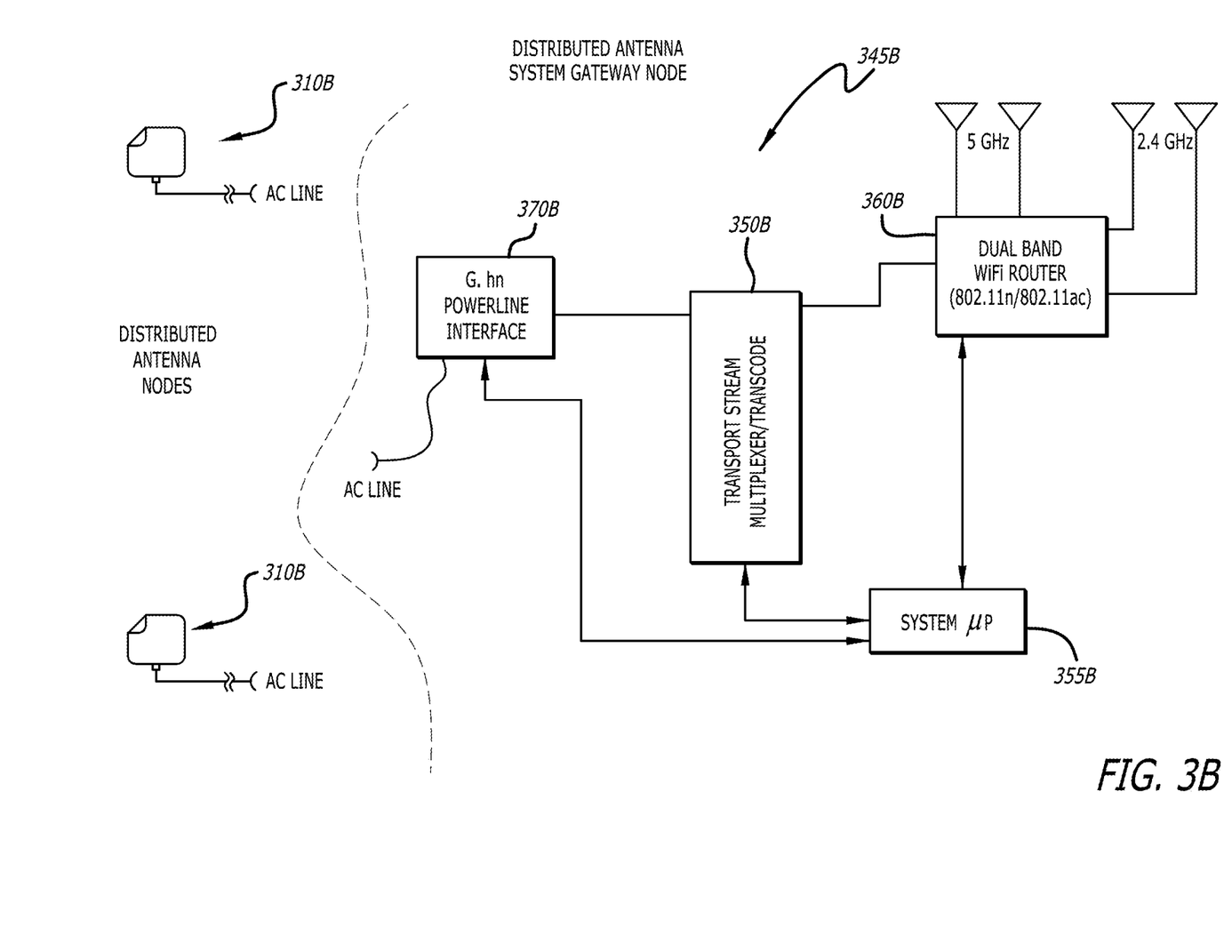
FIG. 3B illustrates a block diagram of a distributed antenna system gateway node, as well as a Wi-Fi interface and a powerline interface.

Referring now to the embodiment of FIG. 3B, the distributed indoor smart over-the-air antenna system depicts a distributed antenna system gateway node 345B, as well as a Wi-Fi interface 360B and a powerline interface 370B. The distributed antenna system gateway node 345B includes a transport stream/multiplexer/transcoder 350B and a processor 355B. In some embodiments, the distributed antenna system gateway node 345B connects to multiple distributed antenna system remote nodes 310B via a powerline interface 310B. Optionally, the distributed antenna system gateway node 345B enables the signals received from different tuners/demodulators 340B to be multiplexed in any combination and transmitted over a network to the display device using a transport stream/multiplexer/transcoder 350B, as well as a Wi-Fi router 360.

The use of powerline interfaces (e.g., G.hn or HomePlug) may provide particularly technological improvements in some embodiments, as these interfaces may not require a separate connection to a communication network. Notably, powerline interfaces utilize existing AC line power to transmit signals over a powerline network. Optionally, one or more Wi-Fi antennas for the Wi-Fi router may be included in the device, such as Wi-Fi antennas optimized for receiving and/or transmitting wireless network signals (e.g., in 2.4 GHz and 5 GHz band). Various other controllers and processors may also be included in the distributed indoor smart over-the-air antenna system. In other embodiments, other network interfaces may be used in place of the Wi-Fi router and/or G.hn powerline, such as an Ethernet, HomePlug, Coaxial cable, CAT-5 cable, and the like.

Various embodiments of the distributed indoor smart over-the-air antenna system may also incorporate storage subsystems that enable the system to function as a digital video recorder (DVR) system. Additionally, the distributed indoor smart over-the-air antenna system may include multiple active distributed antenna nodes, with each antenna node including a tuner/demodulator. Accordingly, each tuner/demodulator associated with the active distributed antenna nodes may simultaneously and independently tune to different channels using the different active distributed antenna nodes in the system. This capability provides significant technical utility when signal loss is encountered in association with a single active distributed antenna node and tuner/demodulator. In some embodiments, multiple signals that are independently received by different tuners/demodulators using different active distributed antenna nodes may be stitched together into a single uninterrupted signal, thereby overcoming the signal loss through the combining of the signals.

In various embodiments, the active distributed antenna nodes may broadcast their networking identification information. The reception gateway may search for this information and respond to the active distributed antenna nodes with a request to establish a connection. In other embodiments, a user may input the networking information into the reception gateway, after which the reception gateway may send a connection request to the active distributed antenna nodes. In some embodiments, the request includes the networking identification information of the reception gateway. In at least one embodiment, the reception gateway may exchange other connection information, such as encryption keys or other networking information, with the active distributed antenna nodes to establish the connection between the devices.

Figure 4:
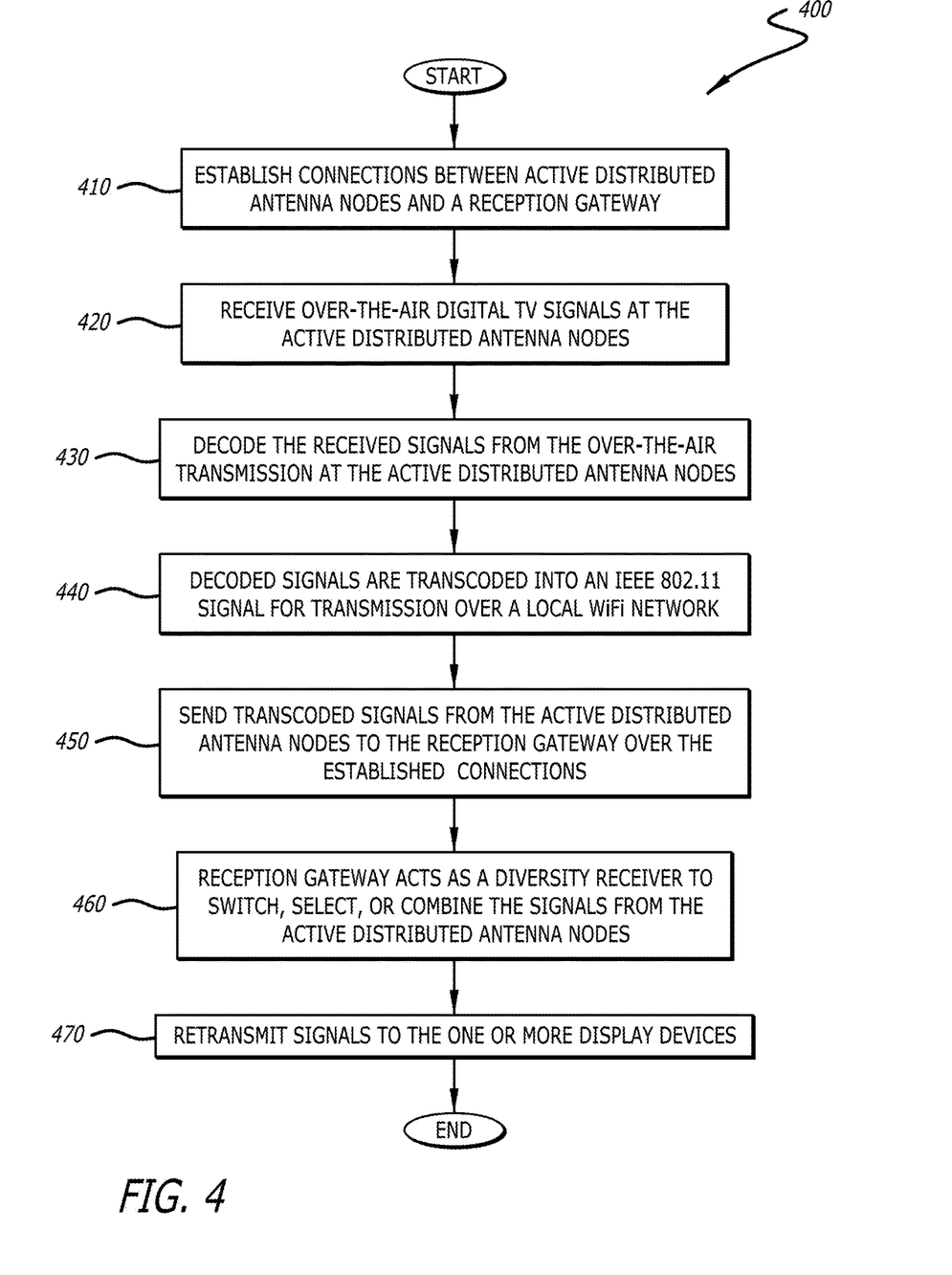
FIG. 4 illustrates a logical flow diagram of an over-the-air reception process employing an over-the-air television receiver system for receiving and retransmitting over-the-air digital television signals to a display device in accordance with embodiments described herein.

FIG. 4 illustrates an over-the-air TV signal reception process 400 for receiving and retransmitting over-the-air digital TV signals to a display device using a distributed indoor smart over-the-air antenna system. In this signal reception process 400, at Step 410, connections are established between each of a plurality of active distributed antenna nodes and a reception gateway. At Step 420, the over-the-air digital TV signals are received at each of the plurality of active distributed antenna nodes. At Step 430, each of the plurality of active distributed antenna nodes decodes (using, e.g., an ATSC demodulator) the received signals from the over-the-air transmission. At Step 440, the decoded signals are transcoded (e.g., reformatted or encoded) into an IEEE 802.11n/802.11ac signal for transmission over a local Wi-Fi network. At Step 450, the transcoded signals are sent from each of the plurality of active distributed antenna nodes to the reception gateway over the established connections. At Step 460, the reception gateway acts as a diversity receiver to switch, select, or combine the transcoded signals from the plurality of active distributed antenna nodes for retransmission. At Step 470, the signals from the reception gateway are retransmitted to the display device (via a powerline interface, a Wi-Fi interface, Ethernet connection, HomePlug connection, or the like).

Figure 5:
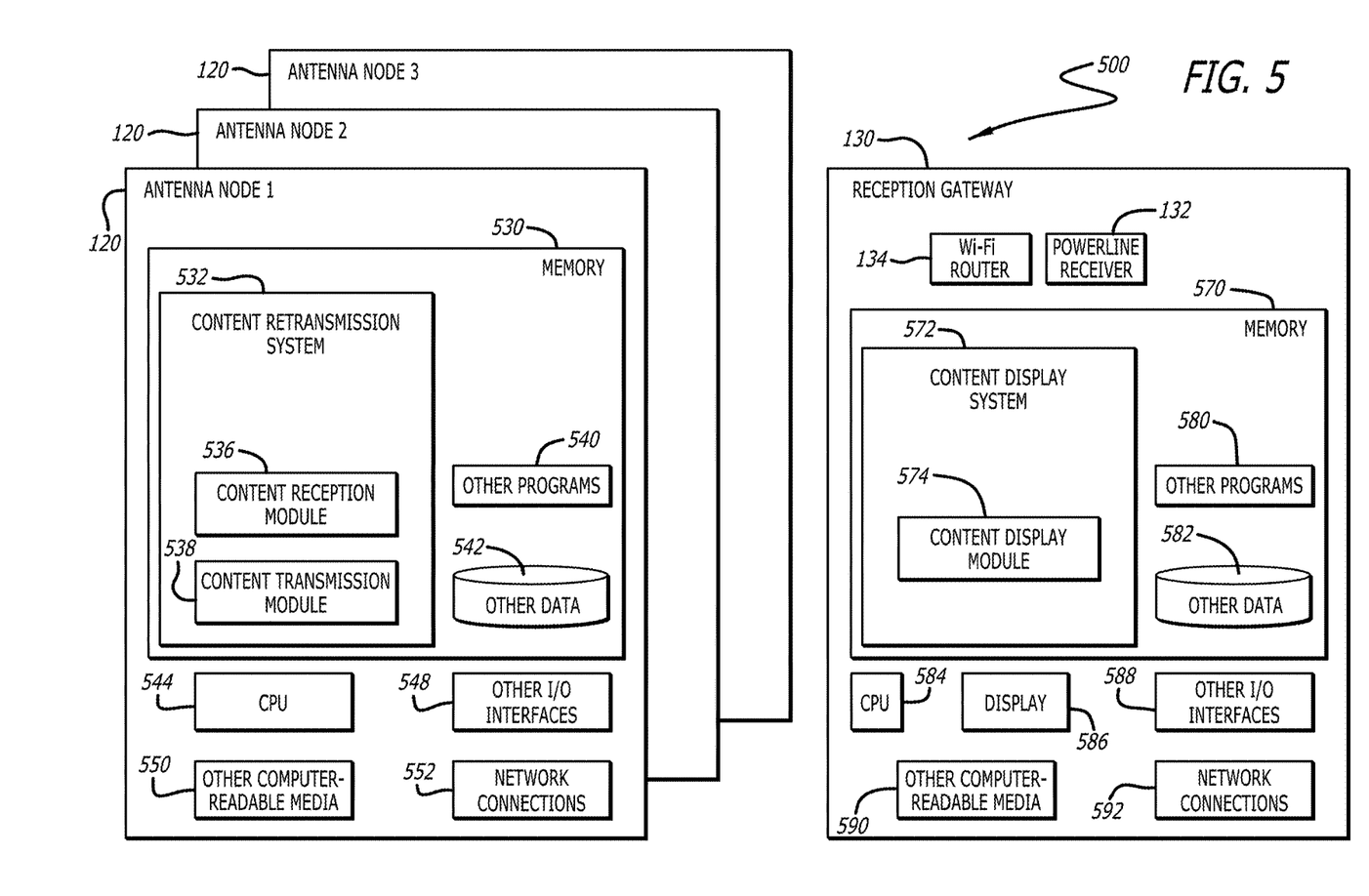
FIG. 5 shows a system block diagram that depicts one implementation of computing systems for employing embodiments described herein.

FIG. 5 shows one implementation of a distributed indoor smart over-the-air antenna system 500 that includes computing systems embodied therein. Specifically, the distributed indoor smart over-the-air antenna system 500 includes a plurality of active distributed antenna nodes 120 and a reception gateway 130. In at least one embodiment, the plurality of active distributed antenna nodes 120 each receive over-the-air broadcast signals from a transmission tower (not shown), decode the received broadcast signals using an ATSC demodulator, and transmit the decoded signal to the reception gateway 130 using a powerline interface or Wi-Fi interface, as described herein. If the decoded signal is transmitted via a Wi-Fi network to the reception gateway 130, the signal is first transcoded into an IEEE 802.11n/802.11ac signal prior to transmission. One or more general-purpose or special-purpose computing systems may be used to implement the plurality of active distributed antenna nodes 120. Accordingly, various embodiments described herein may be implemented in software, hardware, firmware, or in some combination thereof. The plurality of active distributed antenna nodes 120 may each include memory 530, one or more central processing units (CPUs) 544, other I/O interfaces 548, other computer-readable media 550, and network connections 552.

In at least one embodiment, the memory 530 of the plurality of active distributed antenna nodes 120 may include one or more various types of non-volatile and/or volatile storage technologies. Examples of memory 530 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The memory 530 may be utilized to store information, including computer-readable instructions that are utilized by CPU 544 to perform actions, including embodiments performed by the plurality of active distributed antenna nodes 120, as described herein.

In some embodiments, the memory 530 may have stored thereon a content retransmission system 532, a content reception module 536, and a content transmission module 538. The content reception module 536 may employ embodiments described herein to receive content via over-the-air transmission signals and decode the signals as appropriate. The content reception module 536 may utilize network connections 552 to receive over-the-air signals from a transmission tower (not illustrated). The content transmission module 538 may employ embodiments described herein to convert the received signals into wireless local area network signals for transmission to the reception gateway 130 using a powerline or the IEEE 802.11n/802.11ac standard. The content transmission module 538 may utilize network connections 552 to transmit the converted signals to the reception gateway 130 over the wireless local area network. The memory 530 may also store other programs 540 or other data 542.

In at least one embodiment of the distributed indoor smart over-the-air antenna system 500, the plurality of active distributed antenna nodes 120 further include other I/O interfaces 548, other computer-readable media 550, and network connections 552. The other I/O interfaces 548 may include a keyboard, audio interfaces, other video interfaces, or the like. The other computer-readable media 550 may include other types of stationary or removable computer-readable media, such as removable flash drives, external hard drives, or the like. The network connections 552 may be configured to communicate with other computing devices via one or more networks (not shown).

Referring now to the reception gateway 130, as shown in FIG. 5, one or more general-purpose or special-purpose computing systems may be used to implement the reception gateway 130. Accordingly, various embodiments described herein may be implemented in software, hardware, firmware, or in some combination thereof. In some embodiments, the reception gateway 130 may include a memory 570, one or more central processing units (CPUs) 584, a display interface 586, other I/O interfaces 588, other computer-readable media 590, and network connections 592.

In some embodiments, the memory 570 of the reception gateway 130 may include one or more various types of non-volatile and/or volatile storage technologies. Examples of memory 570 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The memory 570 may be utilized to store information, including computer-readable instructions that are utilized by CPU 584 to perform actions, including embodiments performed by the reception gateway 130, as described herein.

In at least one embodiment, the memory 570 of the reception gateway 130 may have stored thereon a content display system 572, which includes a content display module 574. In some embodiments, the content display module 574 receives signals over a powerline connection and/or wireless local area network and provides the signals to a display device, such as display devices 160 in FIG. 1. In some embodiments, the signals that contain the audiovisual content may be retransmitted to the display device 160 via display interface 586, which may include a wired connection between the reception gateway 130 and the display device 160. In other embodiments, the content may be transcoded into IEEE 802.11ac signals and retransmitted to the display device 160 via network connections 592 using a user's local Wi-Fi network. Additionally, the memory 570 of the reception gateway 130 may also store other programs 580 or other data 582.

In at least one embodiment of the distributed indoor smart over-the-air antenna system 500, the reception gateway 130 further includes a display interface 586, other I/O interfaces 588, other computer-readable media 590, and network connections 592. In some embodiments, the display interface 586 is configured to provide signals to a display device, such as display device 160 in FIG. 1. The other I/O interfaces 588 may include a keyboard, audio interfaces, other video interfaces, or the like. The other computer-readable media 590 may include other types of stationary or removable computer-readable media, such as removable flash drives, external hard drives, or the like. Additionally, the network connections 592 are configured to communicate with other computing devices via one or more networks (not shown).

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

The invention claimed is:

1. A system for receiving over-the-air broadcast signals, the system comprising:
   a plurality of distributed antenna nodes, each of the plurality of distributed antenna nodes being spaced apart from each other to achieve spatial diversity, each of the plurality of distributed antenna nodes including:
     a single antenna that receives the over-the-air broadcast signals;
     a single demodulator in communication with the single antenna, wherein the single demodulator decodes the over-the-air broadcast signals, the single antenna having a one to one connection with the single demodulator in which the single demodulator only receives signals from the single antenna; and
     a single Wi-Fi converter that transcodes the decoded broadcast signals into a Wi-Fi signal format, the single demodulator having a one to one connection with the single Wi-Fi converter in which the single Wi-Fi converter only receives signals from the single demodulator;
   each of the plurality of distributed antenna nodes transcoding the decoded broadcast signals into a Wi-Fi signal format using the single Wi-Fi converter in each of the plurality of active distributed antenna nodes, and each of the plurality of distributed antenna nodes sending the transcoded broadcast signals to a single reception gateway; and
   the single reception gateway including a Wi-Fi receiver that receives the transcoded broadcast signals from each of the plurality of distributed antenna nodes, and a diversity receiver that determines a signal set from the plurality of distributed antenna nodes to retransmit to a display device, wherein the single reception gateway receives multiple transcoded broadcast signals in the Wi-Fi signal format, each from a single antenna node, and transmits the single determined signal set to the display device.

2. The system of claim 1, wherein the signal set that is retransmitted is a set of one that includes only a single signal from one distributed antenna node in the plurality of distributed antenna nodes.

3. The system of claim 1, where in the signal set that is retransmitted is a set that includes multiple signals that are sent from multiple distributed antenna nodes in the plurality of distributed antenna nodes.

4. The system of claim 1, wherein each of the plurality of distributed antenna nodes acts as an independent tuner.

5. The system of claim 4, further comprising a multiplexer in communication with each of the independent tuners, wherein the multiplexer generates a multiplexed stream using the decoded broadcast signals.

6. The system of claim 1, wherein the plurality of distributed antenna nodes each further comprises a powerline interface.

7. The system of claim 6, wherein the reception gateway further comprises a powerline receiver, and wherein the reception gateway receives the decoded broadcast signals via the powerline interface from each of the plurality of distributed antenna nodes.

8. The system of claim 1, wherein the over-the-air broadcast signals are digital television over-the-air broadcast signals.

9. The system of claim 1, wherein the display device includes a television, a desktop computer, a laptop computer, a smart phone, a tablet, or combinations thereof.

10. The system of claim 1, wherein the reception gateway transmits the transcoded broadcast signals to the display device via an Ethernet connection.

11. The system of claim 1, wherein the reception gateway transmits the transcoded broadcast signals to the display device via a wired connection.

12. The system of claim 1, wherein the reception gateway further formats the transcoded broadcast signals into another wireless standard for retransmission to the display device.

13. The system of claim 1, wherein the reception gateway includes a Wi-Fi antenna that retransmits the transcoded broadcast signals to the display device.

14. A method of receiving over-the-air broadcast signals, the method comprising:
   placing and orienting a plurality of active distributed antenna nodes, each of the plurality of active distributed antenna nodes being spaced apart from each other to achieve spatial diversity, each of the plurality of active distributed antenna nodes including a single antenna, a single demodulator, and a single Wi-Fi converter, the single antenna having a one to one connection with the single demodulator in which the single demodulator only receives signals from the single antenna, the single demodulator having a one to one connection with the single Wi-Fi converter in which the single Wi-Fi converter only receives signals from the single demodulator;
   receiving broadcast signals at the single antenna in each of the plurality of active distributed antenna nodes;
   decoding the plurality of broadcast signals using the single demodulator in each of the plurality of active distributed antenna nodes;
   transcoding the plurality of decoded broadcast signals into a Wi-Fi signal format using the single Wi-Fi converter in each of the plurality of active distributed antenna nodes;
   receiving the plurality of transcoded broadcast signals at a single reception gateway from each of the plurality of active distributed antenna nodes, the reception gateway including a Wi-Fi receiver that receives the transcoded broadcast signals from each of the plurality of distributed antenna nodes, wherein the single reception gateway receives multiple transcoded broadcast signals in the Wi-Fi signal format each from a single antenna node;

determining, using a diversity receiver in the single reception gateway, a signal set from the plurality of distributed antenna nodes to retransmit to a display device; and retransmitting the determined signal set to the display device.

15. The method of claim 14, wherein the signal set that is retransmitted is a set of one that includes only a single signal from one distributed antenna node in the plurality of distributed antenna nodes.

16. The method of claim 14, where in the signal set that is retransmitted is a set that includes multiple signals that are sent from multiple distributed antenna nodes in the plurality of distributed antenna nodes.

17. The method of claim 14, wherein each of the plurality of distributed antenna nodes acts as an independent tuner.

18. The method of claim 17, further comprising generating a multiplexed stream using the decoded broadcast signals and a multiplexer in communication with each of the independent tuners.

19. The method of claim 14, wherein the plurality of distributed antenna nodes each further comprise a powerline interface.

20. The method of claim 19, further comprising receiving the decoded broadcast signals via the powerline interface of each of the plurality of distributed antenna nodes at a powerline receiver in the reception gateway.

21. The method of claim 14, wherein the reception gateway transmits the transcoded broadcast signals to the display device via an Ethernet connection.

22. The method of claim 14, wherein the reception gateway transmits the transcoded broadcast signals to the display device via a wired connection.

23. The method of claim 14, wherein the reception gateway further formats the transcoded broadcast signals into another wireless standard for retransmission to the display device.

24. The method of claim 14, wherein the reception gateway includes a Wi-Fi antenna that retransmits the transcoded broadcast signals to the display device.

25. A system for receiving over-the-air broadcast signals, the system comprising:

a plurality of distributed antenna nodes, each of the plurality of distributed antenna nodes being spaced apart from each other to achieve spatial diversity, each of the plurality of distributed antenna nodes including:

a single antenna that receives the over-the-air broadcast signals, a single demodulator in communication and connectivity with the single antenna, wherein the single demodulator decodes the over-the-air broadcast signals, the single antenna having a one to one connection with the single demodulator in which the single demodulator only receives signals from the single antenna and a single Wi-Fi converter that transcodes the decoded broadcast signals into a Wi-Fi signal format, the single demodulator having a one to one connection with the single Wi-Fi converter in which the single Wi-Fi converter only receives signals from the single demodulator;

each of the plurality of distributed antenna nodes transcoding the decoded broadcast signals into a Wi-Fi signal format using the single Wi-Fi converter in each of the plurality of active distributed antenna nodes, and each of the plurality of distributed antenna nodes sending the transcoded broadcast signals to a single reception gateway using the Wi-Fi converter in each of the plurality of distributed antenna nodes; and the single reception gateway including a Wi-Fi receiver that receives the transcoded broadcast signals from each of the plurality of distributed antenna nodes, and a diversity receiver that determines a signal set from the plurality of distributed antenna nodes to retransmit to a display device.

26. The system of claim 25, wherein the signal set that is retransmitted is a set of one that includes only a single signal from one distributed antenna node in the plurality of distributed antenna nodes.

27. The system of claim 25, where in the signal set that is retransmitted is a set that includes multiple signals that are sent from multiple distributed antenna nodes in the plurality of distributed antenna nodes.

28. The system of claim 25, further comprising a powerline interface that uses G.hn home networking specification to transmit decoded broadcast signals to the reception gateway.

29. The system of claim 28, wherein the G.hn home networking specification enables transmission of the decoded broadcast signals to the reception gateway using legacy wires that include telephone wiring, coaxial cables, power lines, or combinations thereof.

* * * * *